United States Patent
Kitamura et al.

(10) Patent No.: US 8,797,015 B2
(45) Date of Patent: Aug. 5, 2014

(54) SWITCHING POWER SUPPLY DEVICE, AND ADJUSTABLE POWER SUPPLY SYSTEM INCLUDING THE SAME

(75) Inventors: Noriyuki Kitamura, Kanagawa-ken (JP); Yuji Takahashi, Kanagawa-ken (JP); Koji Takahashi, Kanagawa-ken (JP); Toru Ishitaka, Kanagawa-ken (JP); Koji Suzuki, Kanagawa-ken (JP)

(73) Assignee: Toshiba Lighting & Technology Corporation, Kanagawa-ken (JP)

( * ) Notice: Subject to any disclaimer, the term of this patent is extended or adjusted under 35 U.S.C. 154(b) by 165 days.

(21) Appl. No.: 13/232,294

(22) Filed: Sep. 14, 2011

(65) Prior Publication Data
US 2012/0069616 A1 Mar. 22, 2012

(30) Foreign Application Priority Data

Sep. 17, 2010 (JP) .................................. 2010-208953
Apr. 13, 2011 (JP) .................................. 2011-089621

(51) Int. Cl.
*G05F 1/00* (2006.01)
(52) U.S. Cl.
USPC .......................................... 323/290; 323/901
(58) Field of Classification Search
USPC ................. 323/238, 240, 252, 290, 901, 908; 363/52–54, 95, 96–98, 131, 132, 135, 363/136
See application file for complete search history.

(56) References Cited

U.S. PATENT DOCUMENTS

| 4,060,758 A * | 11/1977 | Wright .......................... 323/289 |
| 4,694,386 A * | 9/1987 | de Sartre ......................... 363/49 |
| 5,099,409 A * | 3/1992 | Bando et al. .................... 363/54 |

(Continued)

FOREIGN PATENT DOCUMENTS

| EP | 2592901 A1 | 5/2013 |
| JP | 2004-296205 | 10/2004 |
| WO | 2010-011971 A1 | 1/2010 |

OTHER PUBLICATIONS

Chinese Office Action mailed Oct. 24, 2013 for Chinese Patent Application No. 201110273025.5, 15 pages.

(Continued)

*Primary Examiner* — Adolf Berhane
*Assistant Examiner* — Gary Nash
(74) *Attorney, Agent, or Firm* — Amin, Turocy & Watson, LLP (57) ABSTRACT

According to one embodiment of the invention, there is provided a switching power supply device including a rectifying circuit and a switching operation conversion circuit. The rectifying circuit receives a phase-controlled alternating voltage to rectify to a direct voltage. The switching operation conversion circuit starts up by being applied with the direct voltage, and includes a normally on type switching element and an off driving circuit. The normally on type switching element passes an input current, and the off driving circuit turns off the switching element when the input current reaches a prescribed value. The switching operation conversion circuit converts the direct voltage to an output voltage different from the direct voltage by repeating a switching operation of turning on and off the switching element.

13 Claims, 8 Drawing Sheets

(56) References Cited

U.S. PATENT DOCUMENTS

| | | | |
|---|---|---|---|
| 5,111,379 A * | 5/1992 | Sharber et al. | 363/128 |
| 5,969,957 A * | 10/1999 | Divan et al. | 363/36 |
| 6,055,167 A * | 4/2000 | Shamkovich et al. | 363/52 |
| 6,556,459 B2 * | 4/2003 | Okui et al. | 363/37 |
| 7,633,771 B2 * | 12/2009 | Sack | 363/37 |
| 2005/0007088 A1 * | 1/2005 | Yang et al. | 323/283 |
| 2008/0224629 A1 | 9/2008 | Melanson | |
| 2009/0086515 A1 * | 4/2009 | Sakakibara | 363/37 |
| 2009/0315477 A1 | 12/2009 | Kinsella | |
| 2012/0242238 A1 | 9/2012 | Chen et al. | |

OTHER PUBLICATIONS

Extended European Search Report for Application No. 111815726. 06-1809/2432298 Dated Mar. 24, 2014, 7 pgs.

Rand, et al "Issues, Models and Solutions for Triac Modulated Phase Dimming of LED Lamps", Power Electronics Specialists Conference, 2007. PESC 2007, Jun. 17, 2007, pp. 1398-1404. IEEE, Piscataway, NJ, USA.

* cited by examiner

FIG. 8

SWITCHING POWER SUPPLY DEVICE, AND ADJUSTABLE POWER SUPPLY SYSTEM INCLUDING THE SAME

CROSS-REFERENCE TO RELATED APPLICATIONS

This application is based upon and claims the benefit of priority from the prior Japanese Patent Application No. 2010-208953, filed on Sep. 17, 2010 and Japanese Patent Application No. 2011-089621, filed on Apr. 13, 2011; the entire contents of which are incorporated herein by reference.

FIELD

Embodiments described herein relate generally to a switching power supply device operating by inputting a phase-controlled alternating voltage and causing a load to operate by driving an output, and an adjustable power supply system including the device.

BACKGROUND

A two-wire phase control dimmer is configured to control a phase of AC voltage by a triac, and is used mainly for lump dimming or the like. This dimmer is designed assuming that an incandescent bulb is a load, and configured to determine an on-phase of the triac by a phase control circuit which operates in series connection to a filament of the incandescent bulb as the load for turning on the triac. However, this dimmer is commonly used, and thus it is preferred that this can be used for light dimming of an alternative incandescent bulb type LED lump or an alternative incandescent bulb type fluorescent lump other than the incandescent bulb. These lumps incorporate a lighting circuit including mainly a switching power supply such as a DC chopper and an inverter, and thus express an impedance different from the incandescent bulb.

However, the above dimmer determines the on-phase of the triac on the basis of an inputted value, thereby when the dimmer is series-connected to the incandescent bulb type LED or the incandescent bulb type fluorescent lump, the dimmer is affected by the impedance of these lumps. In order to operate normally the dimmer, in determining a dimming phase angle, it is necessary for the load impedance of the incandescent bulb type LED or the incandescent bulb type fluorescent lump series-connected to the phase control circuit to be stably low. When the load impedance is low, a circuit current is low in operation of the phase control circuit of the above dimmer, thereby there is approximately no problem as long as the load impedance is low in some degree (approximately a few hundreds Ω). On the contrary, if the load impedance varies or is a high impedance, a required circuit current for the phase control circuit of the dimmer cannot be acquired, thereby the power supply cannot be turned on at a desired phase. As a result, failures such as brightness flicker or non-lighting occur.

The above dimmer incorporates the triac being turned off during the off-phase, and thus a load current does not pass. At this time, the switching power supply incorporated in the load has generally a high impedance. However, the incorporated lightning circuit is connected to a noise prevention circuit or a smoothing capacitor, therefore if the supply is connected to the above dimmer as is, a failure occurs because of the unstable impedance.

Furthermore, when the phase control of the above dimmer is turned on, if the switching power supply incorporated in the load does not start up quickly in response to the turning on, on/off operation, turning off followed by turning on again and off, namely chattering may be repeated, because the triac is unable of holding the on-state.

In order to avoid the problem described above, it is possible to stabilize the operation by performing an action adding a changeover circuit causing the load impedance to lower or the like during the phase when the triac of the above dimmer is turned off. A dummy load made of a resistance can be also connected in parallel to an input side of the incandescent bulb type LED or the incandescent bulb type fluorescent lump or the like. Furthermore, the start up circuit can be also devised so as to start up quickly the switching power supply.

However, in the conventional techniques described above, because the phase control type dimmer such as a two-wire control dimmer is used, a circuit configuration for enabling dimming of lumps such as an incandescent bulb type LED lump or an incandescent bulb type fluorescent lump is complicated.

The invention provides a switching power supply device and an adjustable power supply system including the device. In the device, a special additional circuit is not necessary for adjusting a load by using the phase control circuit and the circuit configuration is simplified.

DETAILED DESCRIPTION

According to one embodiment, there is provided a switching power supply device including a rectifying circuit and a switching operation conversion circuit. The rectifying circuit receives a phase-controlled alternating voltage to rectify to a direct voltage. The switching operation conversion circuit starts up by being applied with the direct voltage, and includes a normally on type switching element and an off driving circuit. The normally on type switching element passes an input current, and the off driving circuit turns off the switching element when the input current reaches a prescribed value. The switching operation conversion circuit converts the direct voltage to an output voltage different from the direct voltage by repeating a switching operation of turning on and off the switching element.

According to one other embodiment, there is provided a switching power supply device including a pair of normally on type switching elements, a pair of off driving circuits, and a pair of rectifying elements. The pair of normally on type switching elements are configured to start up by being applied with a phase-controlled alternating voltage to pass an input current. The pair of off driving circuits are configured to turn off the pair of switching elements when the input current reaches a prescribed value. The pair of rectifying elements are connected between an output terminal and each of the pair of switching elements, and configured to output a rectified direct voltage to the output terminal.

According to one other embodiment, there is provided an adjustable power supply system including a phase control circuit, a switching power supply device, and a load. The phase control circuit is configured to phase-control an alternating voltage. The switching power supply device is configured to receive an alternating voltage phase-controlled by the phase control circuit to output an output voltage. The load is configured to be operated by an output voltage of the switching power supply device. The switching power supply device includes a rectifying circuit and a switching operation conversion circuit. The rectifying circuit is configured to receive the alternating voltage phase-controlled to rectify a direct voltage. The switching operation conversion circuit is configured to start up by being applied with the direct voltage and includes a normally on type switching element and an off driving circuit. The normally on type switching element passes an input current. the off driving circuit turns off the switching element when the input current reaches a prescribed value, and is configured to convert the direct voltage to an output voltage different from the direct voltage by repeating a switching operation of turning on and off the switching element.

First Embodiment of Switching Power Supply Device

Figure 1:
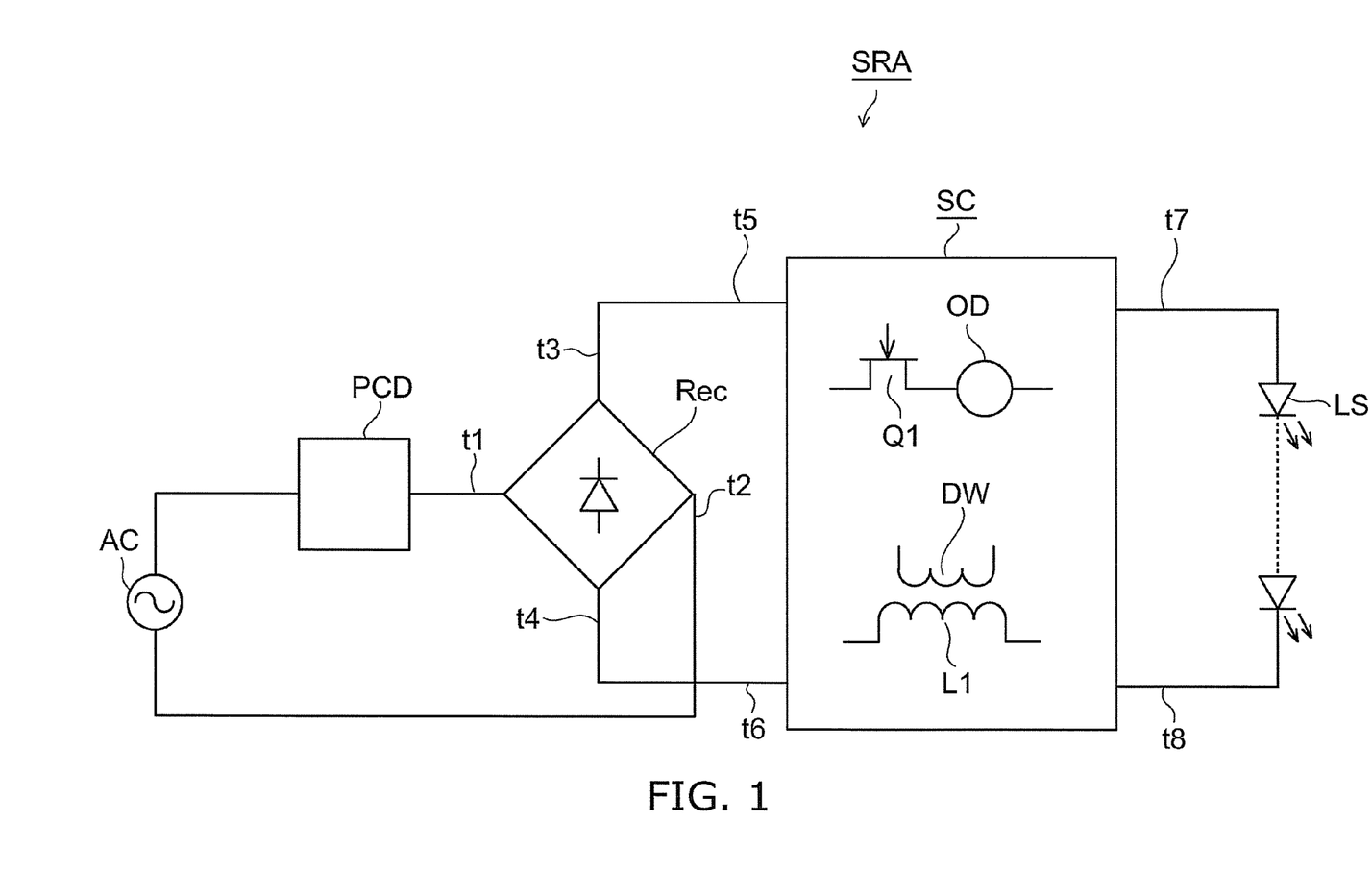
FIG. 1 is a block diagram illustrating an adjustable power supply system including a switching power supply device according to a first embodiment.
Figure 2:
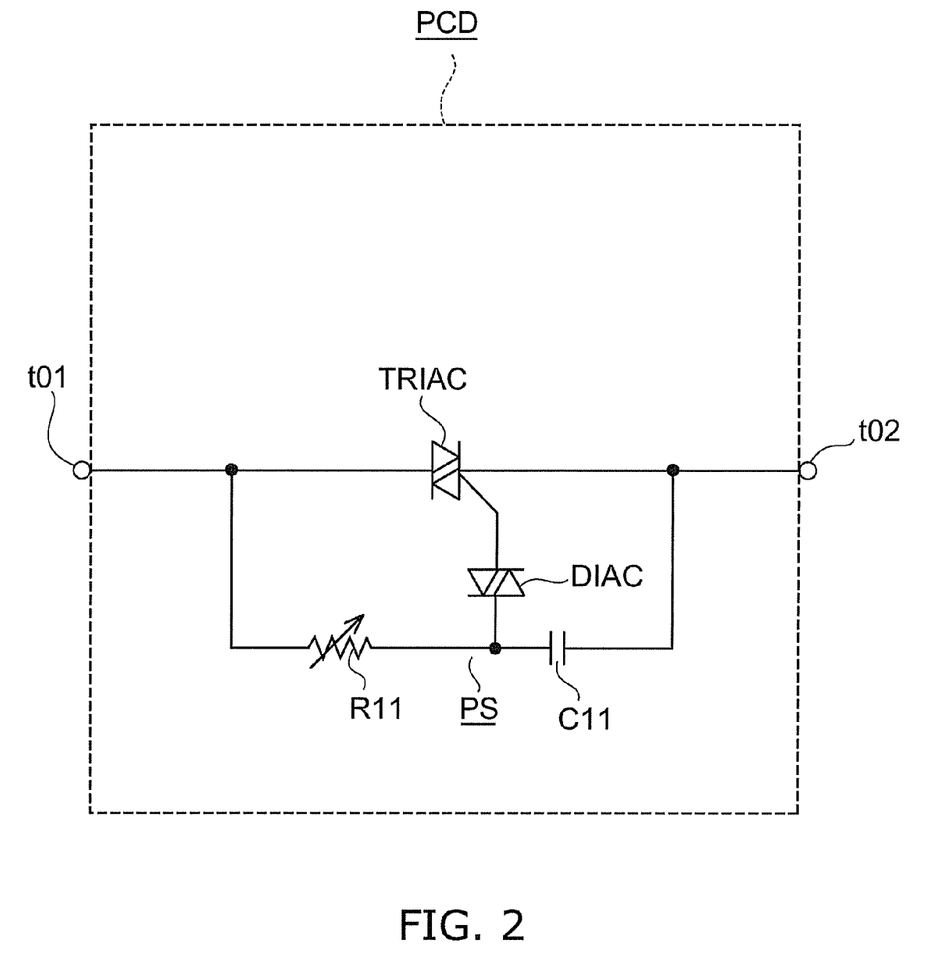
FIG. 2 is a circuit diagram illustrating a phase control circuit in the first embodiment.

FIG. 1 is a block diagram illustrating an adjustable power supply system including a switching power supply device according to a first embodiment and FIG. 2 is a circuit diagram illustrating a phase control circuit in the first embodiment.

In the first embodiment, as shown in FIG. 1, a switching power supply device SRA includes input ends t1, t2, a rectifying circuit Rec, a switching operation conversion circuit SC and output ends t7, 78 to cause a load LS to operate.

The input ends t1, t2 are connected to an AC power supply AC via a phase control circuit PCD. As shown in FIG. 2, the phase control circuit PCD is a two-wire circuit inserted into one of a pair of lines extending from the AC power supply AC, and is configured to include terminals t01, t02, a triac TRIAC and a phase-shift circuit PS.

The triac TRIAC is connected between the terminals t01 and t02. The triac TRIAC is a two-direction three-terminal thyristor being capable of switching by controlling similarly a current passing in an either forward or backward direction by one gate electrode.

The phase-shift circuit PS is a circuit for turning on the triac TRIAC at a desired phase of a power supply voltage. The phase-shift circuit PS is mainly formed of a variable time constant circuit. That is, a series circuit of variable resistor R11 and a capacitor C11 are connected between the terminals t01 and t02 as shown in FIG. 2. The phase-shift output can be outputted from the connection point of the variable resistor R11 and the capacitor C11 by varying the resistance of the variable resistor R11. The phase-shift output supplies a gate current to the gate of the triac TRIAC via a diac DIAC for trigger. When a prescribed gate current is supplied, the triac TRIAC is turned on. If a self-holding current passes at turn-on, on-state is kept during a half-cycle of an alternate-current voltage.

A noise preventing capacitor can be connected in parallel to the triac TRIAC as desired. A noise preventing inductor can be connected in series to the triac TRIAC. Thus, the noise preventing capacitor and the noise preventing inductor form a noise preventing circuit.

Returning to FIG. 1, the description will be continued again. A rectifying circuit Rec converts the phase-controlled alternating voltage applied between the input ends t1 and t2 of the switching power supply device SRA into a direct voltage and applies between input terminals t5, t6 of the switching operation conversion circuit SC. If the rectifying circuit Rec functions as described above, the specific configuration is not particularly limited. For example, a bridge type full-wave rectifying circuit can be used as shown in figure. The rectifying circuit Rec is allowed to include a smoothing circuit as desired.

In the embodiment, the switching operation conversion circuit SC is a conversion circuit formed of a switching element Q1 and an off driving circuit OD of the switching element Q1 for converting and adjusting a power of a power conversion device outputting desired output power from input power. The output is either direct current or alternating current. The operation of the switching operation conversion circuit SC is either self-excited or separately-excited.

Therefore, in the embodiment, the switching power supply device SRA is not only a switching power supply device formed of a DC-DC converter converting the direct-current power to another direct-current power and the rectifying circuit Rec converting the alternating-current power to a constant direct-current power but also a switching power supply device formed of an inverter serving as a DC-AC converter and the rectifying circuit Rec. The DC-DC converter includes a switching control scheme flyback converter and forward converter. The switching control scheme is a so called direct-current chopper and includes a falling voltage type, a rising voltage type and a rising-falling type or the like. In the embodiment, the switching power supply device SRA may be a multiple circuit, namely described later, of the rectifying circuit Rec and the switching operation conversion circuit SC.

In the embodiment shown in FIG. 1, the switching operation conversion circuit SC is the switching control scheme, and includes the input terminals t5, 56, the normally on type switching element Q1, the off driving circuit OD, an inductor L1 and a driving winding DW or the like. The output is supplied between output ends t7, t8 of the switching power supply device SRA.

The input terminals t5, 56 are connected to direct-current output terminals t3, t4 of the rectifying circuit Rec, and the direct-current input voltage corresponding to the phase-controlled alternating voltage is applied the terminals t3, t4.

The normally on type switching element Q1 is a switching element making conductive between the terminals without application of the voltage to the control terminals, and is preferably made of a wide band gap semiconductor switching element serving as a switching element based on a wide band gap semiconductor. However, a specific material of the wide band gap semiconductor is not particularly limited. For example, the switching element may be based on a semiconductor (wide band gap semiconductor) having a wide band gap such as SiC (silicon carbide), GaN (gallium nitride) and diamond. The wide band gap semiconductor refers to a semiconductor having a band gap wider than a band gap of about 1.4 eV of gallium arsenide (GaAs). For example, semiconductors having a band gap of 1.5 eV or more such as gallium phosphide (GaP, band gap of about 2.3 eV), gallium nitride (GaN, band gap of about 3.4 eV), diamond (C, band gap of about 5.27 eV), aluminum nitride (AlN, band gap of about 5.9 eV) and silicon carbide (SIC) or the like are included. In the embodiment shown in the figure, the wide band gap semiconductor switching element adopts the switching element Q1 made of a GaN-HEMT mainly formed of GaN.

The wide band gap semiconductor switching element Q1 is switched in a mega-hertz region (MHz), for example, at a frequency of 10 MHz or more, and thereby the circuit is extremely minimized, and has a feature of highly reduced switching loss, because the on resistance is small. When the switching element Q1 is normally on type, the element can be turned off by setting the control terminal (gate) potential negative to the main terminal (source) potential.

The off driving circuit OD is a circuit turning off the normally on type switching element Q1 when a current passing through the switching element Q1 reaches a prescribed value. For example, the off driving circuit OD can be formed of a constant current circuit and a current detection type response circuit or the like.

The constant current circuit is a circuit having constant current characteristics, for example, various constant current circuits based on a constant current diode, a junction type FET, a three terminal regulator and a transistor can be used. The constant current circuit using the transistor is allowed to be a known constant current circuit of one transistor or two transistors. The normally on or normally off type wide band gap semiconductor switching element of one kind of the junction type FET, for example, GaN-HEMT can be used for the constant current circuit. The wide band gap switching element is preferable for high speed switching because of excellent characteristics at a high frequency of MHz region, for example, of 1 MHz or more.

When the off driving circuit OD is made of the constant current circuit, for example as shown in a second embodiment described later, in a first circuit A in which a current passes through the inductor L1 at turn-on of the normally on type switching element Q1, the off driving circuit OD is connected in series to the normally on type switching element Q1. The above off driving circuit OD is also connected in series to the driving circuit of the above switching element Q1 including the driving winding DW driving the above switching element Q1. The off driving circuit OD includes the configuration like this. When the increasing current passing through the off driving circuit OD reaches a predetermined value and tends to exceed more, the voltage of the off driving circuit OD increases drastically, thereby the voltage increase occurring in the off driving circuit OD at that time allows a potential of the main terminal (source) incorporated in the driving circuit of the above switching element Q1 to be relatively higher than a potential of the control terminal (gate). As a result, because the potential of the control terminal becomes lower than a threshold voltage of the above switching element Q1, the above switching element Q1 can be turned OFF. This circuit operation becomes easier and surely, because the above switching element Q1 is normally on type and the threshold voltage is negative.

In the case where the off driving circuit OD is made of the current detection type response circuit, the main configuration component of the circuit is a current detector, a comparator and a switch. The current detector is made of a resistor connected in series to the main terminal (source) of the normally on type switching element Q1. The comparator is made of an operational amplifier inputting the voltage of the current detector to an inverting input terminal and connecting a reference potential source indicating the prescribed current value to a non-inverting input terminal. The switch is made of a transistor, for example, connecting a collector to the control terminal (gate) of the normally on type switching element Q1, connecting an emitter to the main terminal (source) of the above normally on type switching element Q1 via a lump (load) LS and connecting a base to the output terminal of the comparator. When the increasing current passing through the current detector exceeds a prescribed value, the comparator produces output and the switch is turned ON. As a result, because the potential of the control terminal (gate) of the normally on type switching element Q1 is negative to the potential of the main terminal (source) of the above switching element Q1, the above switching element Q2 is turned off.

The inductor L1 stores magnetic energy inside, when the above switching element Q1 is turned on and the increasing current passes there. The magnetic energy is emitted and a decreasing current is outputted from the inductor L1 when the above switching element Q1 is turned off. However, use of a transformer having the prescribed inductance is allowed on behalf of the inductor L1. This embodiment is suitable for forming the flyback converter and the forward converter.

The driving winding DW is magnetically coupled with the inductor L1, and the inductive voltage is applied between the control terminal (gate) and the main terminal (source) of the normally on type switching element Q1 directly or, for example, indirectly via the load LS. Therefore, the above switching element Q1 is turned off when the inductive voltage of the driving winding DW is negative potential lower than the potential of the main terminal (source), and turned on when being positive potential higher than the potential of the main terminal (source).

The output ends t7, t8 are end portions to which the output of the switching power device SRA is supplied, therefore the load LS, for example, a lump such as an LED is connected thereto. The load LS is driven by the output of the switching power device SRA to be operated (lighten up).

Next, circuit operation in the first embodiment described above will be described.

The input ends t1, t2 of the switching power supply device SRA are connected to the alternating-current power supply AC via the phase control circuit PCD, and then the phase-controlled alternating voltage is applied to the rectifying circuit Rec. The phase-controlled alternating voltage is rectified by the rectifying circuit Rec, and a direct-current input voltage corresponding to an effective value of the above alternating voltage is outputted from the output terminals t3, t4. This direct-current input voltage is applied to the input terminals t5, t6 of the switching operation conversion circuit SC. On the other hand, because the normally on type switching element Q1 is always turned on, a slight current can be passed through the above phase control circuit PCD. As a result, in the phase control circuit PCD, the phase-shift circuit starts up and begins phase-shift operation, thereby the triac TRIAC turns on at a prescribed phase. The phase-controlled alternating voltage is applied to the rectifying circuit Rec from the input terminals t1, t2 of the switching power supply device SRA, and the direct-current input voltage corresponding to the phase-controlled alternating voltage is applied between the input terminals t5, t6 of the switching operation conversion circuit SC. When the direct-current input voltage is applied, because the switching element Q1 is always turned on, the switching operation conversion circuit SC starts up by passing enough input current from the switching element Q1. As a result, the output converted by the switching operation conversion circuit SC is applied to the output ends t7, t8, and thus the load LS connected to between the above output ends t7, t8 is driven to start to operate.

One Embodiment of Adjustable Power Supply System

An adjustable power supply system shown in FIG. 1 is configured to include the phase control circuit PCD, the switching power supply device SRA and the load LS described above.

The phase control circuit PCD has the configuration shown in FIG. 2 and includes a phase control element, for example, the triac TRIAC and the phase-shift circuit PS as main constituent components. The phase control circuit PCD is connected in series so as to lie between the alternating-current power supply AC and the switching power supply SRA. The triac and a pair of thyristors connected in inverse-parallel can be used for the phase control element.

The alternating-current power supply AC is turned on, the phase-shift circuit PS is connected to the alternating-current power supply AC via the switching power supply device SRA as the load. Because the normally on type switching element Q1 of the switching power supply device SRA is turned on, the phase-shift circuit PS starts to operate quickly. The phase-shift angle changes by operating the above variable resistor R11 to change the resistance value of the phase-shift circuit PS, and thereby a conduction start phase of the phase control element changes in response to this phase-shift angle. The alternating voltage is phase-controlled and electric power supplied to the load LS becomes adjustable (for example, dimming is possible).

The switching power supply device SRA is the first embodiment described above, however of course may be each embodiment described later.

The load LS is allowed to be various.

Second Embodiment of Switching Power Supply Device

Figure 3:
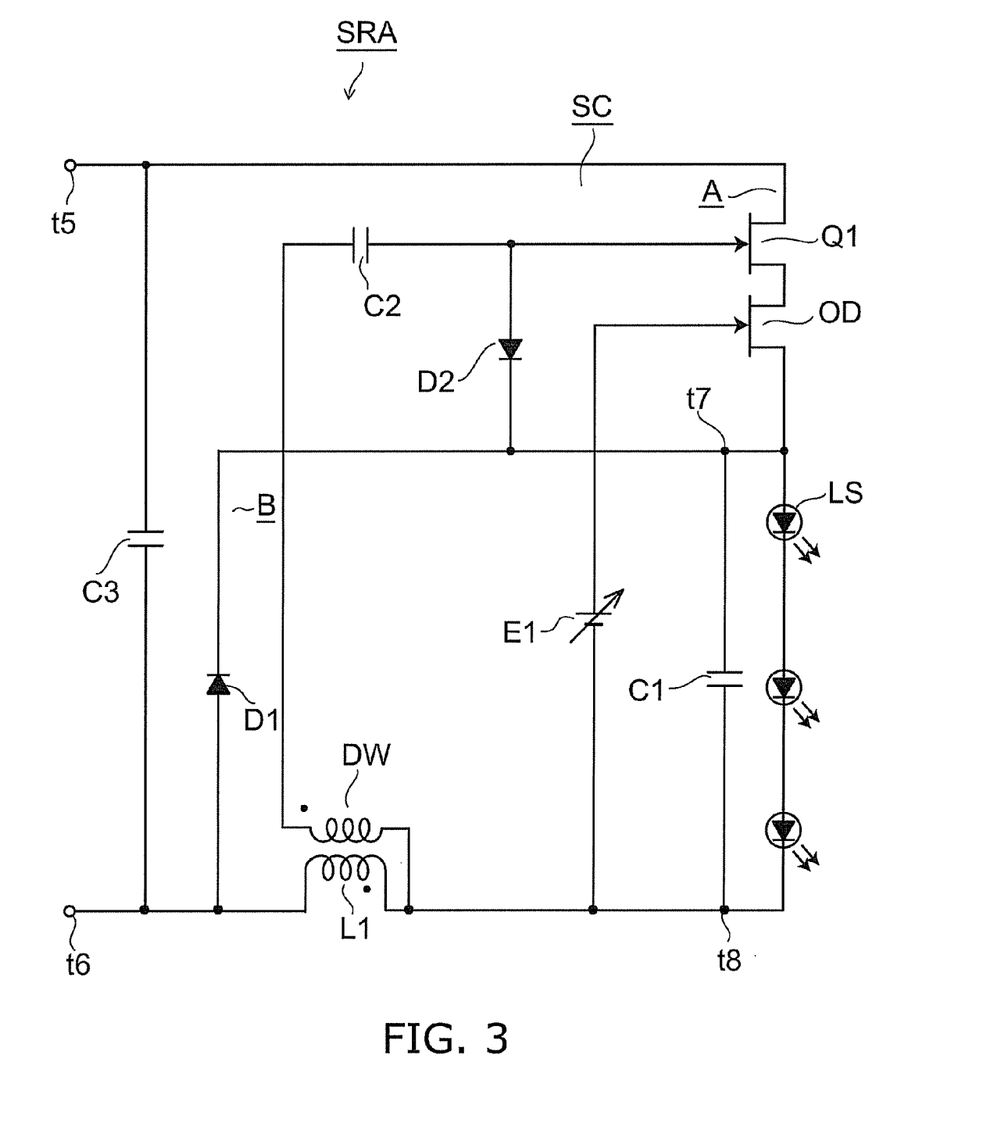
FIG. 3 is a circuit diagram illustrating a relevant part of a switching power supply device according to a second embodiment.

FIG. 3 is a circuit diagram illustrating a relevant part of a switching power supply device according to a second embodiment.

As shown in FIG. 3, the switching operation conversion circuit SC of the second embodiment is made of a falling voltage chopper. Components similar to those in FIG. 1 are marked with like reference numerals. As shown in figure, a series circuit of the input terminal t5, the normally on type switching element Q1, the off driving circuit OD, an output capacitor C1, the inductor L1 and the input terminal t6 forms the first circuit A. The input terminals t5, t6 are connected to the output terminals t3, t4 of the rectifying circuit Rec in FIG. 1. The normally on type switching element Q1 is made of GaN-HEMT. The off driving circuit OD is made of the constant current circuit of GaN-HEMT similar to the switching element Q1. A control voltage E1 adjusting the constant current value is connected between the control terminal (gate) of the off driving circuit OD, namely, the constant current circuit and the output terminal t8. The output terminals t7, t8 are connected from both ends of the output capacitor C1, respectively.

A closed circuit of the inductor L1, a diode D1, the output capacitor C1 and the inductor L1 forms a second circuit B. The diode D1 is made of GaN. The diode D1 may be a synchronous rectifier. When the synchronous rectifier is used, a switching element made of wide band gap semiconductor may be used for the synchronous rectifier as well as the switching element Q1 and the off driving circuit OD.

Furthermore, one end (left end in FIG. 3) of the driving winding DW magnetically coupled with the inductor L1 is connected to the control terminal (gate) of the normally on type switching element Q1 via a coupling capacitor C2, and another end (right end in FIG. 3) is connected to a connecting point of the inductor L1 and the output capacitor C1, namely, the output terminal t8. In FIG. 3, an overvoltage protection diode D2 is connected between the control terminal (gate) and the main terminal (source) of the above switching element Q1 via the off-driving circuit OD. A radio-frequency bypass capacitor C3 is connected between the input terminals t5, t6.

Next, circuit operation of the second embodiment will be described.

When the rectifying circuit not shown applies the direct-current input voltage between the input terminals t5, t6, because the normally on type switching element Q1 of the switching operation conversion circuit SC is always turned on, if describing according to FIG. 2, an enough current for operation of the phase-shift circuit PS of the phase control circuit PCD, though being weak current, is flown out to the first circuit A via the not shown phase control circuit inserted on the input side of the rectifying circuit and on the input side of the above switching element Q1 and the constant current circuit of the off driving circuit OD from the rectifying circuit. The diac DIAC as a trigger element turns on at a prescribed phase set in the phase-shift circuit PS, as a result, the triac TRIAC as the phase control element turns on.

Herewith, the phase control circuit PCD outputs the phase-controlled alternating voltage, and thus the rectifying circuit outputs the direct-current input voltage corresponding to the phase-controlled alternating voltage from the output terminal. This direct-current input voltage is applied to the input terminals t5, t6 of the switching operation conversion circuit SC, and then the switching element Q1 passes the input current to start up the switching operation conversion circuit SC. The increasing current passes through the first circuit A formed of the input terminal t5, the normally on type switching element Q1, the off driving circuit OD, the output capacitor C1, the inductor L1 and the input terminal t6, and the magnetic energy is stored in the inductor L1. When the increasing current reaches the preset prescribed current value of the off driving circuit OD, increasing tendency of the current stops and the constant current is kept.

When the increasing current reaches the constant current value of the off driving circuit OD, the current passing through the inductor L1 tends to increase more, and thus the voltage of the off driving circuit OD becomes large in a pulse shape. With this, the main terminal (source) potential of the above switching element Q1 becomes higher than the potential of the control terminal (gate), as a result, the control terminal (gate) becomes relatively negative apparently, and thereby the switching element Q1 is turned off. Therefore, the increasing current passing into the inductor L1 is blocked by turn-off of the above switching element Q1.

At the same time when the above switching element Q1 is turned off, the emission of the magnetic energy stored in the inductor L1 begins and the decreasing current is flown out to the second circuit B. During the passage of the decreasing current, voltage polarity of the inductor L1 reverses to be negative polarity, a voltage causing the control terminal of the above switching element Q1 is induced on the driving winding DW, and a negative voltage is applied between the control terminal (gate) and the main terminal (source) of the above switching element Q1 via the off driving circuit OD, and thereby the above switching element Q1 is kept in the off-state.

The decreasing current passing through the second circuit B becomes zero, and then induction of the negative voltage applied to the control terminal (gate) of the above switching element Q1 is not caused. At the same time, a voltage causing the control terminal (gate) to be positive polarity is induced on the driving winding DW by a back electromotive force, and thereby the above switching element Q1 turns on again, and circuit operation similar to that described above is repeated afterward.

As apparent from the above circuit operation, the switching operation conversion circuit SC performs the falling voltage chopper operation, the output current alternating the increasing current and the decreasing current passes through the load LS connected to the output ends t7, t8 of the switching power supply device SRA, the load LS operates by the direct-current component, and the output capacitor C1 bypasses the outputting radio-frequency component.

Third Embodiment of Switching Power Supply Device

Figure 4:
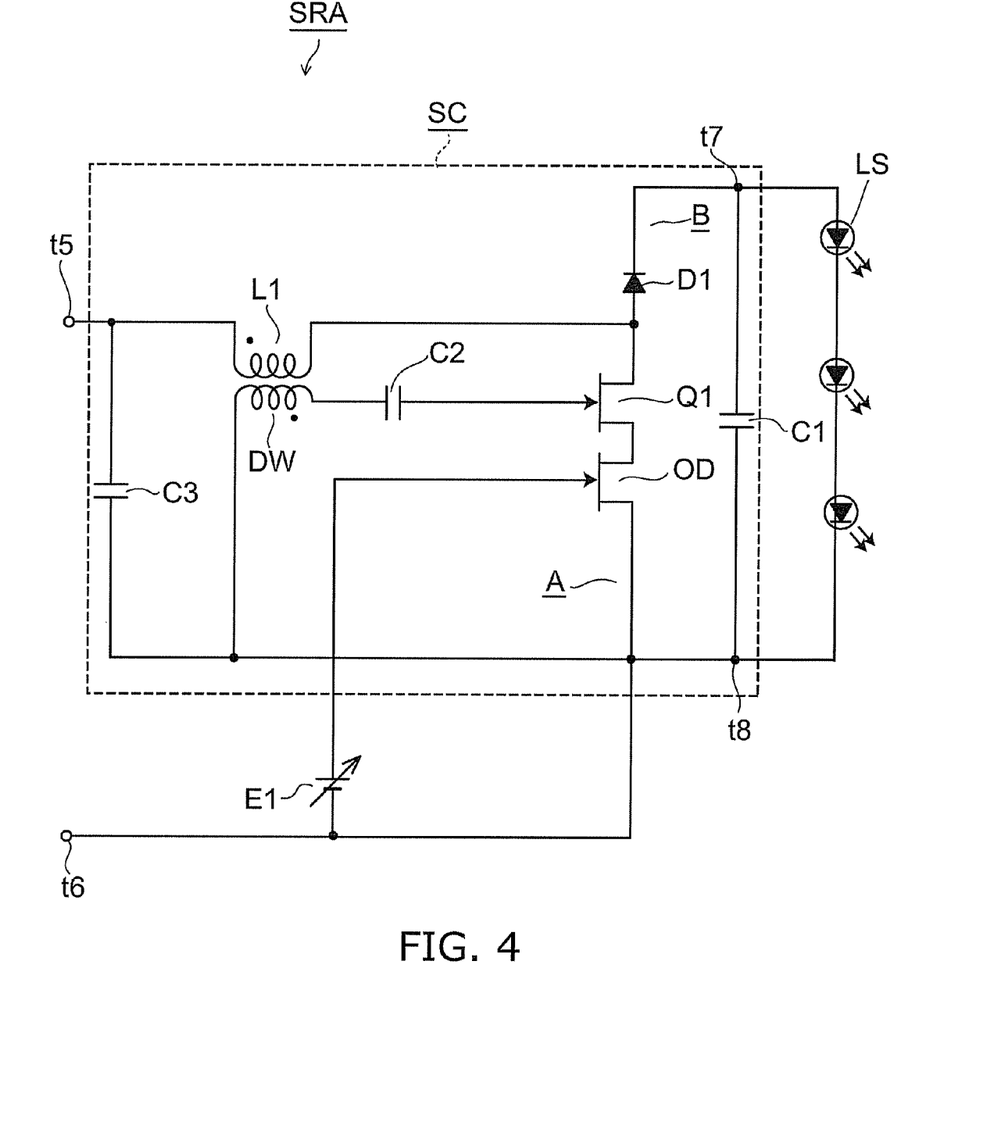
FIG. 4 is a circuit diagram illustrating a relevant part of a switching power supply device according to a third embodiment.

FIG. 4 is a circuit diagram illustrating a relevant part of a switching power supply device according to a third embodiment.

As shown in FIG. 4, the switching operation conversion circuit SC of the third embodiment is made of a rising voltage chopper. Components similar to those in FIG. 3 are marked with like reference numerals. The embodiment is different from the second embodiment in the configuration of the first and second circuits A, B. The first circuit A is formed of the series circuit of the input terminal t5, the inductor L1, the normally on type switching element Q1, the off driving circuit OD and the input terminal t6. The second circuit B is formed of the series circuit of the inductor L1, the diode D1, the output capacitor C1 and the input terminal t6. Other configuration is the same as the second embodiment.

Next, circuit operation of the third embodiment will be briefly described.

The normally on type switching element Q1 is always turned on, therefore when the direct-current input voltage is applied between the input terminals t5, t6 from the rectifying circuit not shown, the phase control circuit PCD starts operation. Because the phase-controlled alternating voltage is converted to the direct-current input voltage by the rectifying circuit to be applied, the increasing current passes through the first circuit A of the switching operation conversion circuit SC. The on-state of the above switching element Q1 is hold because of forward application of the inductive voltage of the driving winding DW to the control terminal (gate) of the above switching element Q1. When the increasing current reaches the constant current value of the off driving circuit OD, voltage drop of the off driving circuit OD increases drastically, and thereby the potential of the control terminal (gate) of the above switching element Q1 becomes negative to the potential of the another main terminal (source) and the above switching element Q1 is turned off.

When the above switching element Q1 is turned off, the magnetic energy stored in the inductor L1 is emitted and the decreasing current passes through the second circuit B. The passage of the decreasing current drives the load LS to light up. During the passage of the decreasing current, a voltage having reverse polarity to the above is induced on the driving winding DW, and thereby the above switching element Q1 is hold in the off-state. When the decreasing current becomes zero, the reverse bias of the control terminal (gate) of the above switching element Q1 diminishes, and thereby the above switching element Q1 turns on again and the above operation is repeated.

In the third embodiment described above, rising of the voltage produces the output voltage higher than the input voltage.

Fourth Embodiment of Switching Power Supply Device

Figure 5:
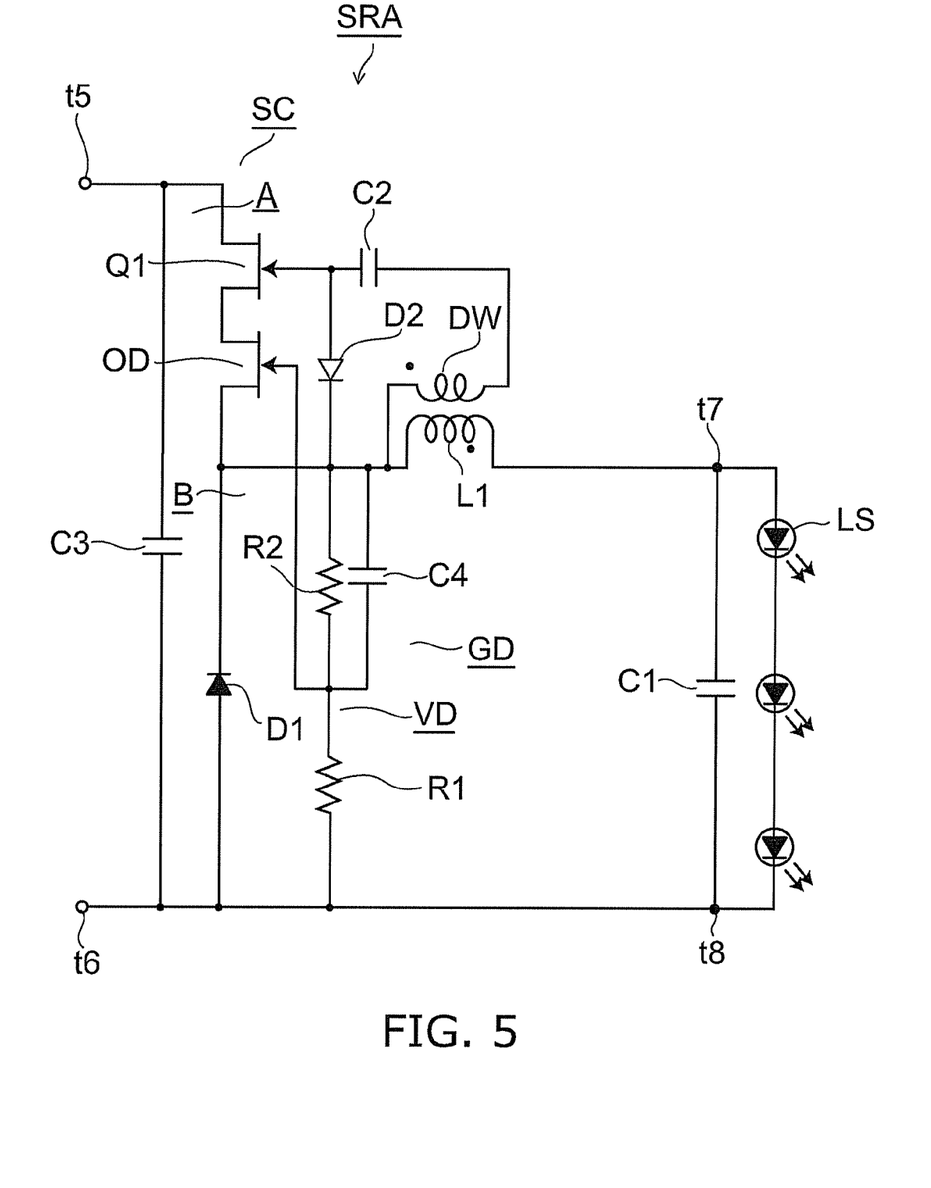
FIG. 5 is a circuit diagram illustrating a relevant part of a switching power supply device according to a fourth embodiment.

FIG. 5 is a circuit diagram illustrating a relevant part of a switching power supply device according to a fourth embodiment.

The circuit configuration of the fourth embodiment is shown in FIG. 5. The switching operation conversion circuit SC is made of the falling voltage chopper similar to the second embodiment and includes a protection circuit so that when the output current tends to exceed a planed maximum current, the operation stops. In the case where the switching power supply device SRA is connected to the alternating-current power supply via the phase control circuit, the switching operation conversion circuit SC is configured so that the input current is passed through at the same time of turning on the alternating-current power supply, the input current being equal to a self-holding current of the phase control element of the phase control circuit or more. Components similar to those in FIG. 3 are marked with like reference numerals.

The fourth embodiment is similar to the second and third embodiments in that the off driving circuit OD desirably sets the constant current characteristics of the switching element similar to the switching element Q1 by changing the voltage applied to the control (gate) terminal, however as shown in FIG. 5, a gate circuit GD of the off driving circuit OD is formed of a voltage-dividing circuit VD and a capacitor C4. In the voltage-dividing circuit VD, the series circuit of resistors R1, R2 is connected in parallel to the diode D1. The capacitor C4 is connected in parallel to the resistor R2. In the gate circuit of this configuration, the voltage of the resistor R2 is smoothed by the capacitor C4 to be applied between the control terminal (gate) and the main terminal (source) of the off driving circuit OD. Optimization of the divided voltage setting satisfies the operation requirements described above.

At the same time of tuning on the alternating-current power supply, the input current being equal to a self-holding current of the phase control element of the phase control circuit or more is passed through. The protection circuit is formed, stopping the operation of the switching operation conversion circuit SC when the input current tends to exceed the planed maximum current. This protection circuit is configured that a voltage applied to the gate of the off driving circuit OD is taken as a value causing the switching element Q1 to be on-state with respect to the current being equal to the self-holding current or more by adjusting the divided output of the voltage-dividing circuit VD preliminary and a threshold value for switching the switching element Q1 from on to off is adjusted preliminary to match the planed maximum current.

Figure 6:
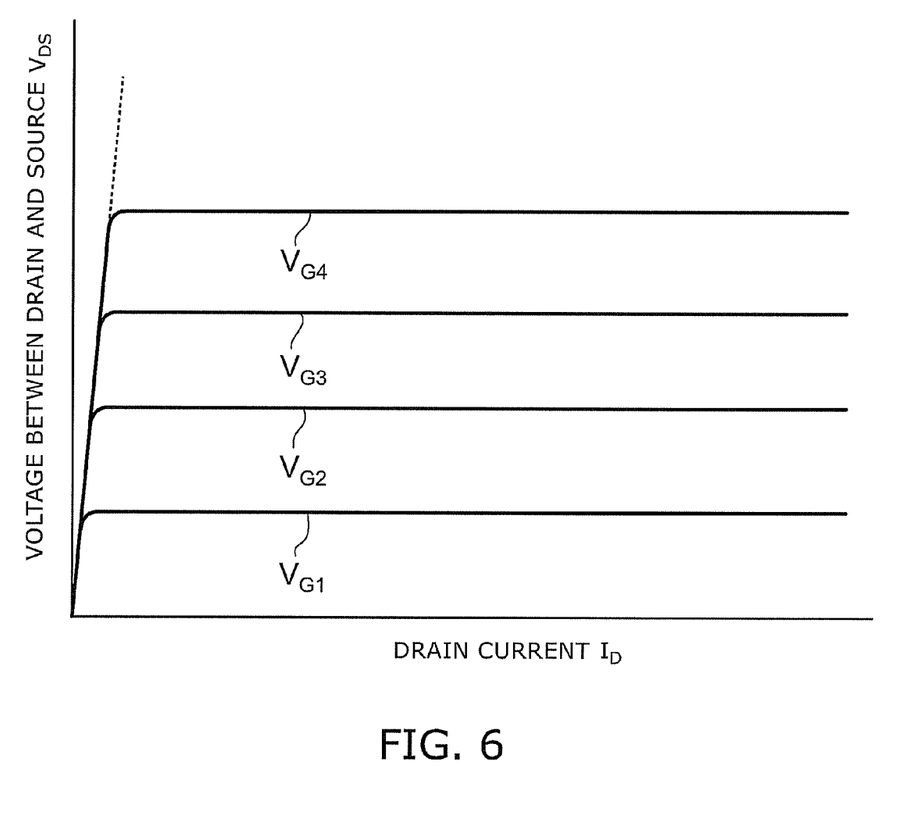
FIG. 6 is a graph view illustrating current-voltage characteristics of a switching element.

That is, the voltage of the off driving circuit OD is sufficient to be set to satisfy an inequality: $V_{th}(Q1) > V_{GS}(Q1) - V_{Q2}$. Here, $V_{th}(Q1)$ is the threshold voltage of the switching element Q1, $V_{GS}(Q1)$ is the voltage between the gate and the source of the switching element Q1, and $V_{Q2}$ is the ON voltage between the drain and the source of the off driving circuit OD. As shown in FIG. 6, $V_{Q2}$ is a product of an on-resistance Ron and a maximum current IMAX in on-region of voltage-current characteristics of the off driving circuit OD, namely, an on-voltage. In the on-region, the voltage is proportional to the current, and the on-resistance Ron is a slope of the on-region in the voltage-current characteristics curve. The above on-voltage $V_{Q2}$ can be selected as desired by adjusting the divided output of the voltage-dividing circuit VD in the gate circuit GD.

Next, the circuit operation is described. In the embodiment, when the not shown alternating-current power supply is turned on and the direct-current input voltage is applied between the input terminals t5, t6, the current equal to the self-holding current of the phase control element of the phase control circuit not shown or more is flown out to the switching element Q1 and the switching power device SRA starts up. If the current passing through the switching element Q1 begins to increase due to some reasons during the operation of the switching power supply device SRA, the on-voltage VQ2 of the off driving circuit OD increases along with this, and thereby when reaching the maximum current, the voltage between the gate-source of the switching element Q1 falls below the threshold voltage and the inequality is realized. As a result, the switching element Q1 turned off. Therefore, the switching operation conversion circuit SC stops the operation and then the safety is realized.

Fifth Embodiment of Switching Power Supply Device

Figure 7:
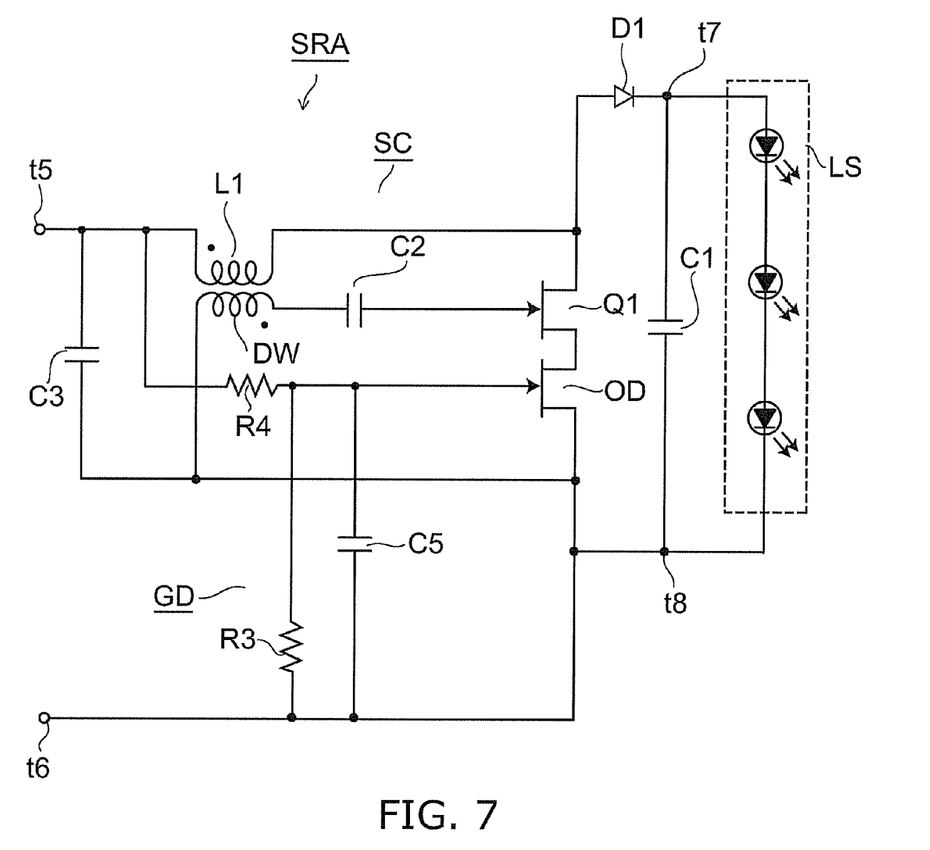
FIG. 7 is a circuit diagram illustrating a relevant part of a switching power supply device according to a fifth embodiment.

FIG. 7 is a circuit diagram illustrating a relevant part of a switching power supply device according to a fifth embodiment.

The circuit configuration of the fifth embodiment is shown in FIG. 7. The switching operation conversion circuit SC is made of the rising voltage chopper similar to the second embodiment, however is different in that the off driving circuit OD is formed of the normally off type switching element. Components similar to those in FIG. 4 are marked with like reference numerals. The gate circuit GD of the off driving circuit OD is formed of a resistor R4 connected between the input terminal t5 and the gate of the off driving circuit OD, a resistor R3 connected between the gate and the source of the off driving circuit OD and a capacitor C5 connected in parallel to the resistor R3.

In the embodiment, as the smoothing capacitor C5 is connected in the gate circuit GD, even if a voltage break occurs between the gate and the source of the normally off type switching element forming the off driving circuit OD, the gate voltage is held by smoothing effect of the capacitor C5, and thereby the off driving circuit OD is prevented from turning off.

As the off driving circuit OD controls the direct-current electricity, a capacitor having relatively large capacitance can be used for the driving circuit. Thereby, the off driving circuit OD can be held at low impedance. Therefore, the off driving circuit OD can adopt the normally off type switching element. On the contrary, as the switching element Q1 performs a high rate switching, a capacitor having relatively large capacitance cannot be used.

Sixth Embodiment of Switching Power Supply Device

Figure 8:
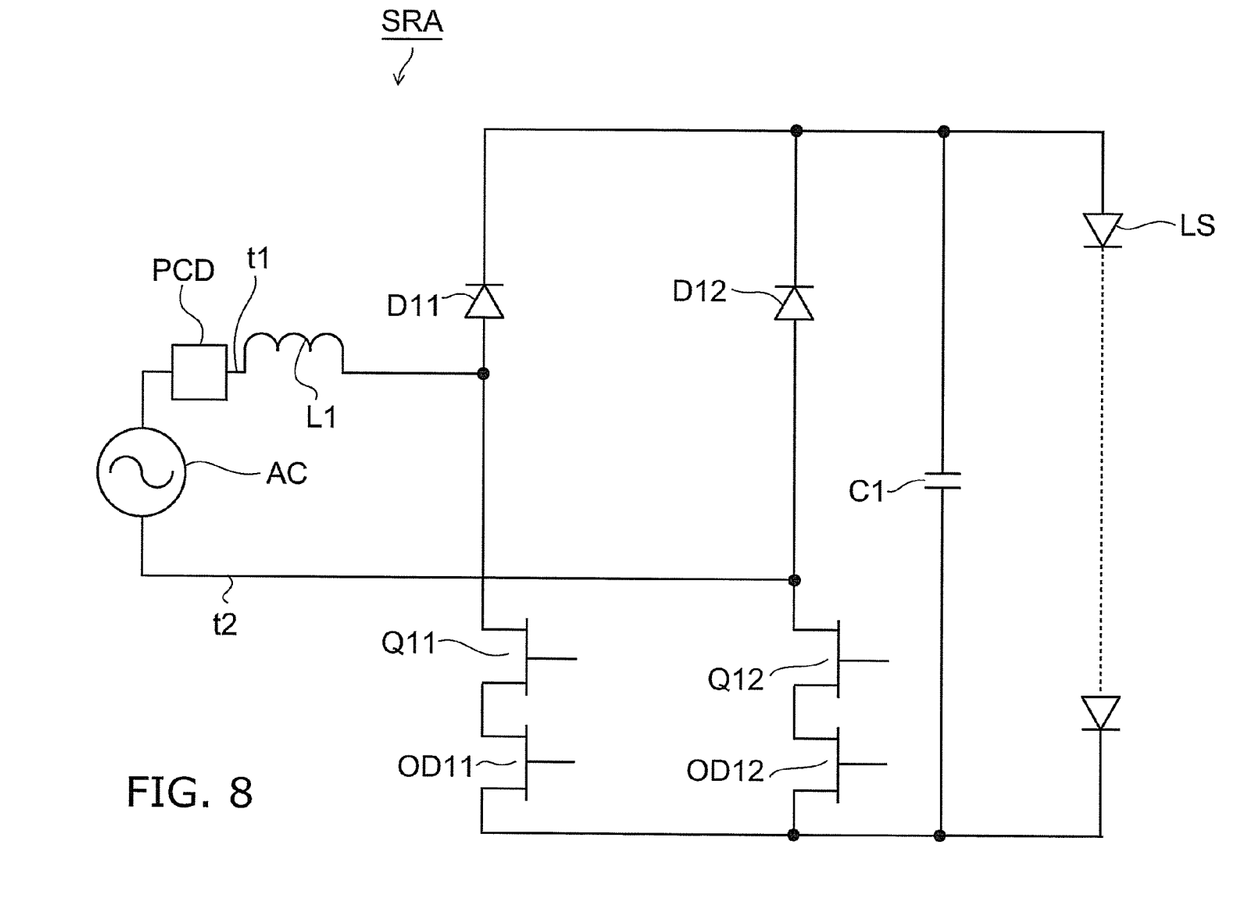
FIG. 8 is a circuit diagram illustrating a relevant part of a switching power supply device according to a sixth embodiment.

FIG. 8 is a circuit diagram illustrating a relevant part of a switching power supply device according to a sixth embodiment.

The circuit configuration of the sixth embodiment is shown in FIG. 8. A pair of diode D11 and D12 of the switching operation conversion circuit SC double as a rectifying circuit. Components similar to those in FIG. 1 are marked with like reference numerals and the description will be omitted. That is, the pair of diodes D11 and D12 and a pair of series circuit of the switching element and the off driving circuit form a bridge circuit, and a series circuit of the alternating-current power supply AC, the phase control circuit PCD and the inductor L1 is connected between a connecting point of a switching element Q11 and the diode D11 and a connecting point of the diode D12 and a switching element Q12. The output capacitor C1 and the load LS are connected in parallel between a connecting point of the diodes D11 and D12 and a connecting point of off driving circuits OD11 and OD12.

In the embodiment, in a half cycle where the input end t1 side of the alternating voltage is positive, the inductor L1, the switching element Q11, the off driving circuit OD11 and the diode D11 perform rising operation, and in a half cycle where being negative, the inductor L1, the switching element Q12, the off driving circuit OD12 and the diode D12 perform the rising operation, and then the load LS connected between the output ends t7, t8 is driven by the direct-current electricity converted in the switching operation conversion circuit SC to be operated. Other operations are similar to those in the first embodiment. The switching elements Q11, Q12 and the off driving circuits OD11, OD12 have rectifying elements not shown, respectively, for example, forming diodes. Therefore, when turned off, a current can be passed through in a direction from the off driving circuit OD11 to the switching element Q11, or in a direction from the off driving circuit OD12 to the switching element Q12. A switching frequency of the switching operation conversion circuit SC is set higher than a frequency of the alternating voltage.

Therefore, if the rectifying circuit Rec and the switching operation conversion circuit of the switching power supply device SRA in the embodiments described above are composite circuits, desired effects can be obtained. Therefore, it is unnecessary to form the rectifying circuit and the switching operation conversion circuit in separately provided circuits, respectively, and it can be understood that separately provided circuits have no particularly technical meaning.

Seventh Embodiment of Switching Power Supply Device

The seventh embodiment omits figures. In the embodiments described above, the switching power supply device SRA includes a load condition detection circuit and a control circuit. The load condition detection circuit detects no load or load anomaly. The control circuit disables the switching power supply device SRA or decreases the output. The control circuit is configured to hold the protection operation for a prescribed time after disabling the switching power supply device SRA and to reset the disabled state after that and recover the initial state. The time from the start of protection operation to the reset is preferred to be at least a half cycle or more of the alternating-current power supply voltage. However, the protection state may be held during turning on of the alternating-current power supply.

In the embodiment, safety is realized when the load state is abnormal. If the abnormal state is solved, automatic restart up can be set. When the alternating-current power supply is once opened and turned on again, reset can be also made possible.

Hereinabove, exemplary embodiments of the invention are described with reference to specific examples. However, the embodiments of the invention are not limited thereto and various modifications are possible.

What is claimed is:
1. A switching power supply device comprising:
a rectifying circuit configured to receive a phase-controlled alternating voltage to rectify to a direct voltage; and a switching operation conversion circuit configured to convert the direct voltage to an output voltage different from the direct voltage, the switching operation conversion circuit including
- a switching element being of a normally on type and having a main terminal and a first control terminal, the direct voltage being applied to the switching element,
- a current control element having at least a second control terminal, the current control element configured to turn off the switching element by lowering a potential of the first control terminal than a potential of the main terminal when a current passing through the current control element exceeds a prescribed value,
- an inductor passing a current when the switching element is of an on-state, and
- a driving winding configured to control turning on or off the switching element by magnetically coupling with the inductor and supplying an induced voltage to the first control terminal, an end of the driving winding being connected to the inductor, another end of the driving winding being connected to the first control terminal.

2. The switching power supply device according to claim 1, wherein the current control element is connected in series to the switching element.

3. The switching power supply device according to claim 1, wherein
the current control element is of a normally off type.

4. The switching power supply device according to claim 1, wherein the inductor is connected to the rectifying circuit.

5. An adjustable power supply system comprising:
a phase control circuit configured to phase-control an alternating voltage;
one of a first switching power supply device and a second switching power supply device, the first switching power supply device and the second switching power supply device being configured to receive an alternating voltage phase-controlled by the phase control circuit to output an output voltage; and
a load configured to be operated by an output voltage of the switching power supply device,
the first switching power supply device including
- a rectifying circuit configured to receive the alternating voltage phase-controlled to rectify a direct voltage, and
- a switching operation conversion circuit configured to convert the direct voltage to an output voltage different from the direct voltage, the switching operation conversion circuit including
- a switching element being of a normally on type and having a main terminal and a first control terminal, the direct voltage being applied to the switching element,
- a current control element having at least a second control terminal, the current control element configured to turn off the switching element by lowering a potential of the first control terminal than a potential of the main terminal when a current passing through the current control element exceeds a prescribed value,
- an inductor passing a current when the switching element is of an on-state, and
- a driving winding configured to control turning on or off the switching element by magnetically coupling with the inductor and supplying an induced voltage to the first control terminal, an end of the driving winding being connected to the inductor, another end of the driving winding being connected to the first control terminal, the second switching power supply device including
- a rectifying circuit configured to receive a phase-controlled alternating voltage to rectify to a direct voltage, and
- a switching operation conversion circuit configured to convert the direct voltage to an output voltage different from the direct voltage, the switching operation conversion circuit including
- a switching element being of a normally on type and having a main terminal and a first control terminal, the direct voltage being applied to the switching element,
- a current control element having at least a second control terminal, the current control element configured to turn off the switching element by lowering a potential of the first control terminal than a potential of the main terminal when a current passing through the current control element exceeds a prescribed value,
- an inductor passing a current when the switching element is of an on-state,
- a rectifying element connected to an end of the inductor, a current passing through the rectifying element when the switching element is of an off-state, and
- a driving winding configured to control turning on or off the switching element by magnetically coupling with the inductor and supplying an induced voltage to the first control terminal, an end of the driving winding being connected to the rectifying element, another end of the driving winding being connected to the first control terminal.

6. The adjustable power supply system according to claim 5, wherein
the phase control circuit includes a phase control element and
an input current to the switching power supply device is larger than a self-holding current of the phase control element.

7. The adjustable power supply system according to claim 5,
wherein the current control element is connected in series to the switching element.

8. The adjustable power supply system according to claim 5, wherein
the current control element is of a normally off type.

9. A switching power supply device comprising:
a rectifying circuit configured to receive a phase-controlled alternating voltage to rectify to a direct voltage; and
a switching operation conversion circuit configured to convert the direct voltage to an output voltage different from the direct voltage,
the switching operation conversion circuit including
a switching element being of a normally on type and having a main terminal and a first control terminal, the direct voltage being applied to the switching element,
a current control element having at least a second control terminal, the current control element configured to turn off the switching element by lowering a potential of the first control terminal than a potential of the main terminal when a current passing through the current control element exceeds a prescribed value, an inductor passing a current when the switching element is of an on-state, a rectifying element connected to one end of the inductor, a current passing through the rectifying element when the switching element is of an off-state, and a driving winding configured to control turning on or off the switching element by magnetically coupling with the inductor and supplying an induced voltage to the first control terminal, an end of the driving winding being connected to the rectifying element, another end of the driving winding being connected to the first control terminal.

10. The switching power supply device according to claim 9, further comprising an output end connected to a load, the inductor being connected to the output end.

11. The switching power supply device according to claim 9, further comprising an output end connected to a load, the rectifying element being connected to the output end.

12. The switching power supply device according to claim 9, wherein the switching operation conversion circuit further includes a gate circuit connected to the second control terminal, the gate circuit includes a voltage-dividing circuit and a capacitor and applies a divided voltage from the voltage-dividing circuit to the second control terminal, the voltage-dividing circuit increases the divided voltage by increasing a current passing through the switching element, the capacitor smoothes the divided voltage, the gate circuit is configured to control the current passing through the current control element and turn off the switching element when the current passing through the current control element exceeds the prescribed value.

13. The switching power supply device according to claim 9, further comprising an output end connected to a load, the current control element further having a main terminal connected to the output end, the switching operation conversion circuit further including a first resistor connected between the rectifying circuit and the second control terminal, a second resistor connected between the second control terminal and the main terminal of the current control element, and a capacitor connected in parallel to the second resistor.

* * * * *